(12) United States Patent
Zhang et al.

(10) Patent No.: US 8,570,731 B2
(45) Date of Patent: Oct. 29, 2013

(54) MOUNTING APPARATUS FOR EXPANSION CARD

(75) Inventors: Guang-Yi Zhang, Shenzhen (CN); Xiao-Zheng Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 283 days.

(21) Appl. No.: 13/224,345

(22) Filed: Sep. 2, 2011

(65) Prior Publication Data
US 2012/0287590 A1   Nov. 15, 2012

(30) Foreign Application Priority Data
May 13, 2011   (CN) .......................... 2011 1 0123439

(51) Int. Cl.
| | |
|---|---|
| G06F 1/16 | (2006.01) |
| H05K 7/00 | (2006.01) |
| H05K 5/00 | (2006.01) |
| H05K 7/14 | (2006.01) |
| H01R 13/62 | (2006.01) |

(52) U.S. Cl.
USPC ................. 361/679.32; 361/679.31; 361/747; 361/759; 361/801

(58) Field of Classification Search
USPC ........................ 361/679.31–679.32, 801, 802, 361/807–810, 752, 790, 747, 759; 439/160
See application file for complete search history.

(56) References Cited

U.S. PATENT DOCUMENTS

| | | | | |
|---|---|---|---|---|
| 5,443,394 A | * | 8/1995 | Billman et al. | 439/157 |
| 5,943,218 A | * | 8/1999 | Liu | 361/801 |
| 6,056,579 A | * | 5/2000 | Richards et al. | 439/358 |
| 6,319,037 B1 | * | 11/2001 | Lai | 439/327 |

* cited by examiner

Primary Examiner — Jayprakash N Gandhi
Assistant Examiner — Nidhi Desai
(74) Attorney, Agent, or Firm — Altis & Wispro Law Group, Inc.

(57) ABSTRACT

A mounting apparatus for fixing an expansion card includes a motherboard, an expansion slot installed on the motherboard, an expansion card inserted into the expansion slot, and two latching members respectively fixed to two ends of the expansion card. Each latching member includes a base plate fixed to the end of the expansion card, and a resilient hook extending from the base plate to latch an end of the expansion slot.

11 Claims, 7 Drawing Sheets

MOUNTING APPARATUS FOR EXPANSION CARD

CROSS-REFERENCE OF RELATED APPLICATIONS

Relevant subject matter is disclosed in three pending U.S. patent applications, all titled "MOUNTING APPARATUS FOR EXPANSION CARD", with the application Nos. 13/217,263, 13/220,705, and 13/223,247, respectively, filed on Aug. 25, 2011, Aug. 30, 2011, and Aug. 31, 2011, which are assigned to the same assignee as this patent application.

BACKGROUND

1. Technical Field

The present disclosure relates to mounting apparatuses, and particularly, to an apparatus for mounting an expansion card.

2. Description of Related Art

Many expansion cards, such as a memory card, are usually fixed on a circuit board of an electronic device, such as a computer or a server, by a mounting apparatus. The mounting apparatus includes an expansion slot to electrically connect the expansion card, and two locking members disposed at two opposite ends of the expansion slot for clamping two opposite ends of the expansion card. However, the expansion slot can only mount one type of expansion card, such as memory cards. An expansion card of a different type, such as a solid state disk card, includes a connector mounted on an end of the card will interfere with the corresponding locking member. Thus, the solid state disk card cannot be fixed only through the locking members.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
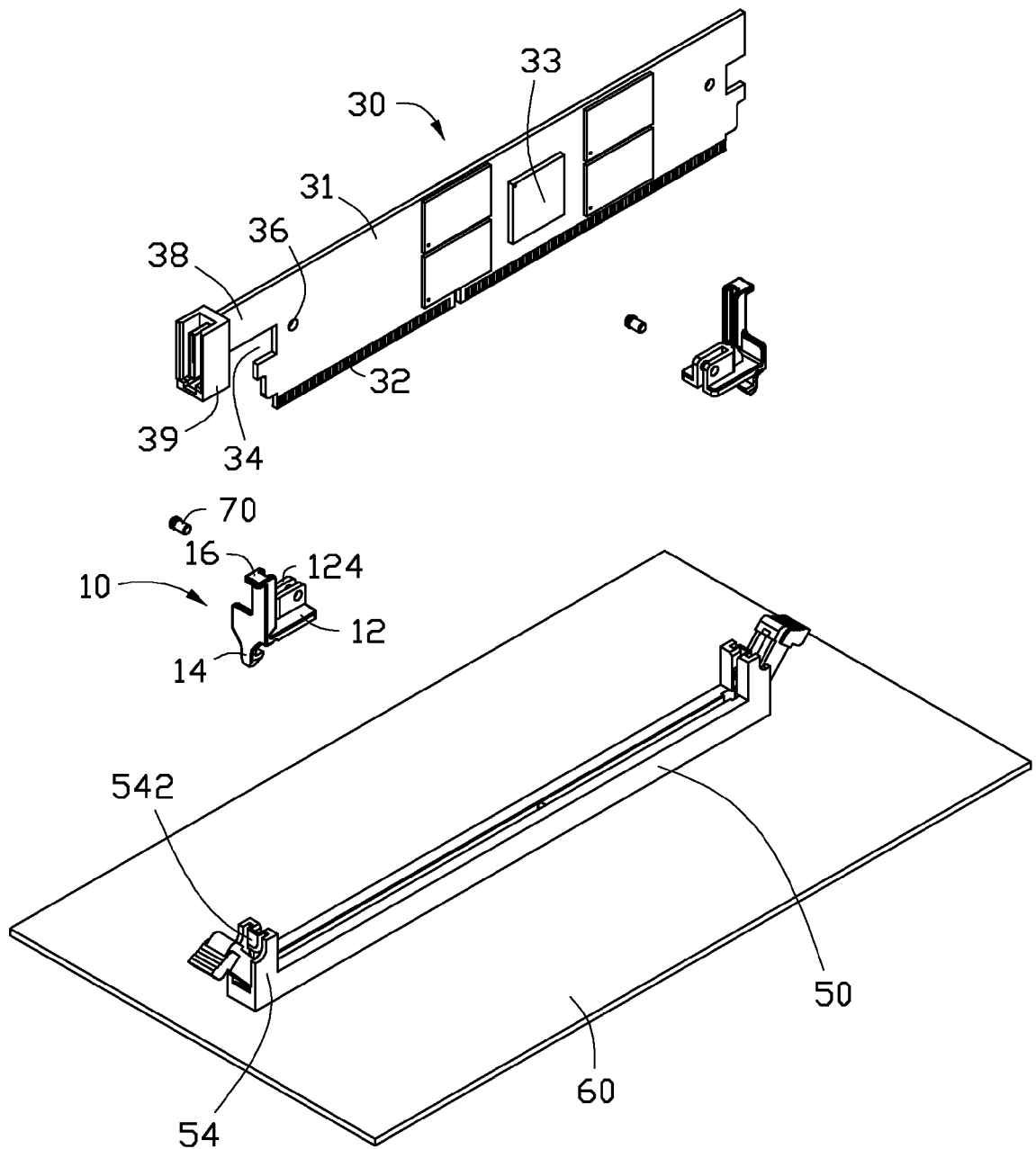
FIG. 1 is an exploded, isometric view of a first exemplary embodiment of a mounting apparatus, together with an expansion card, wherein the mounting apparatus includes two latching members.

Referring to FIG. 1, a first embodiment of a mounting apparatus is used for mounting an expansion card 30. The mounting apparatus includes an expansion slot 50, and two latching members 10 mounted to two opposite ends of the expansion card 30 through two fixing poles 70, respectively.

The expansion slot 50 is installed on a motherboard 60. Two fixing portions 54 extend up from the two opposite ends of the expansion slot 50. Each fixing portion 54 includes a latching block 542 extending out from an upper portion of the fixing portion 54 away from the other fixing portion 54.

The expansion card 30 includes an elongated circuit board 31. An edge connector 32 is formed on a bottom side of the circuit board 31, and a plurality of chips 33 are mounted on a side surface of the circuit board 31. Two cutouts 34 are respectively defined in two opposite ends of the circuit board 31. Two fixing holes 36 are respectively defined at the ends of the circuit board 31, adjacent to the corresponding cutouts 34. An extension plate 38 extends out from one of the ends of an upper portion of the circuit board 31, above the corresponding cutout 34. A connector 39 is fixed on a distal end of the extension plate 38. In the embodiment, the expansion card 30 is a solid state disk card.

Figure 2:
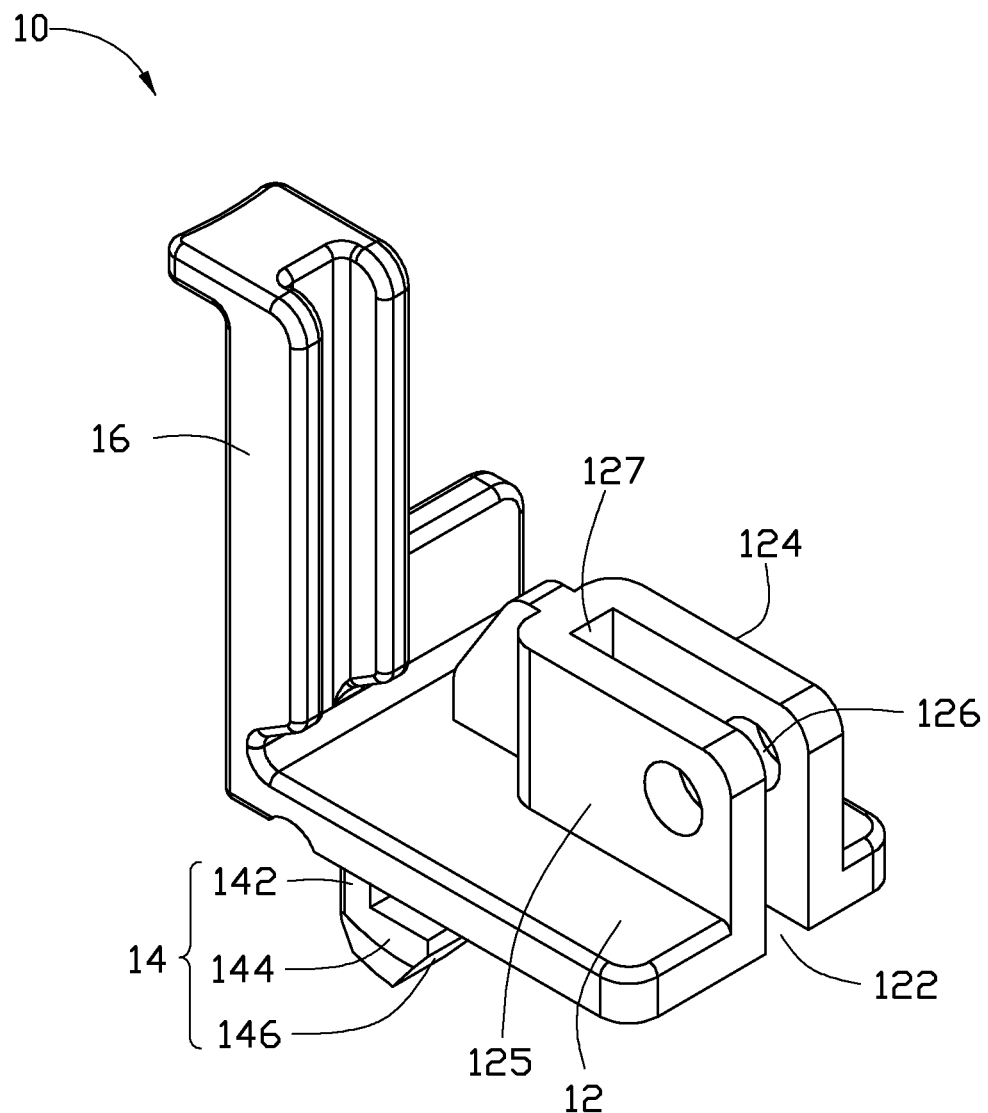
FIG. 2 is an enlarged, isometric view of one of the latching members of FIG. 1, but viewed from another perspective.

Referring to FIG. 2, each latching member 10 includes a rectangular base plate 12, a resilient hook 14 extending down from a rear end of the base plate 12, and an L-shaped operation portion 16 extending up from the rear end of the base plate 12. A connecting slot 122 is defined in a front end of the base plate 12, with an end of the connecting slot 122 extending through the front surface of the base plate 12. A substantially U-shaped latching portion 124 extends up from the base plate 12 around the connecting slot 122. The latching portion 124 includes two opposite engaging plates 125 perpendicularly extending up from the base plate 12 and at opposite sides of the connecting slot 122, and a connecting portion 127 connected between rear ends of the engaging plates 125. Two through holes 126 are defined on opposite front ends of the engaging plates 125. The hook 14 includes a resilient extension plate 142 perpendicularly extending down from the rear end of the base plate 12, and a wedge-shaped latch 144 extending from a distal end of the extension plate 142 and facing the connecting slot 122. A slanted guiding surface 146 is formed on a bottom side of the latch 144, opposite to the base plate 12. In the embodiment, the latching member 10 is made in resilient material, such as plastic, and is integrally formed.

Figure 3:
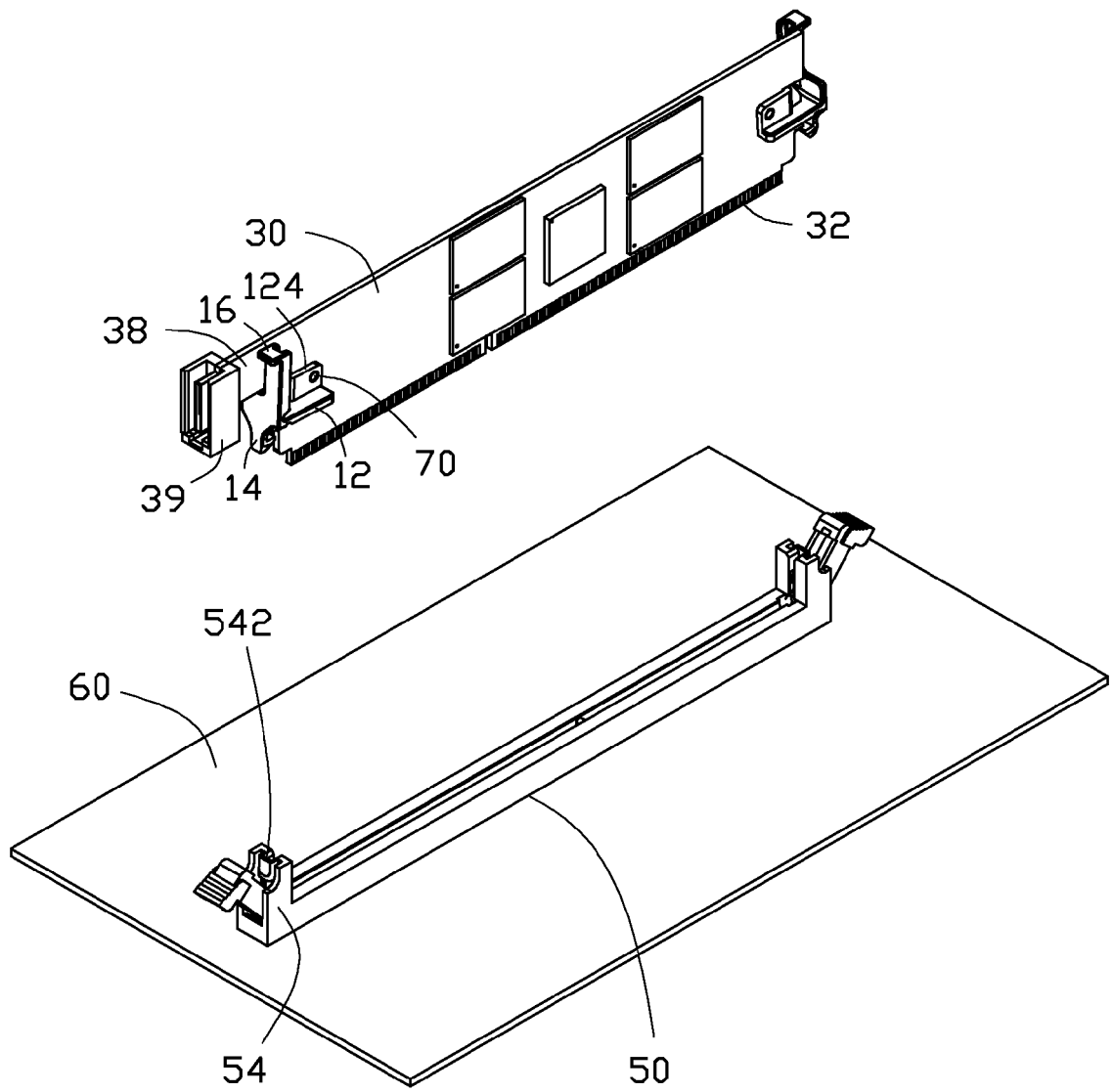
FIG. 3 is a partly assembled, isometric view of the mounting apparatus of FIG. 1.

Referring to FIG. 3, in assembly, each latching member 10 is attached to a corresponding end of the expansion card 30. The latching portion 124 is received in the corresponding cutout 34. The ends of the expansion card 30 are received in the connecting slot 122. The fixing pole 70 is extended through one of the through holes 126, the corresponding fixing hole 36, and the other through hole 126, to fix the latching member 10 to the expansion card 30. The end of the expansion card 30 is sandwiched between the engaging plates 125.

Figure 4:
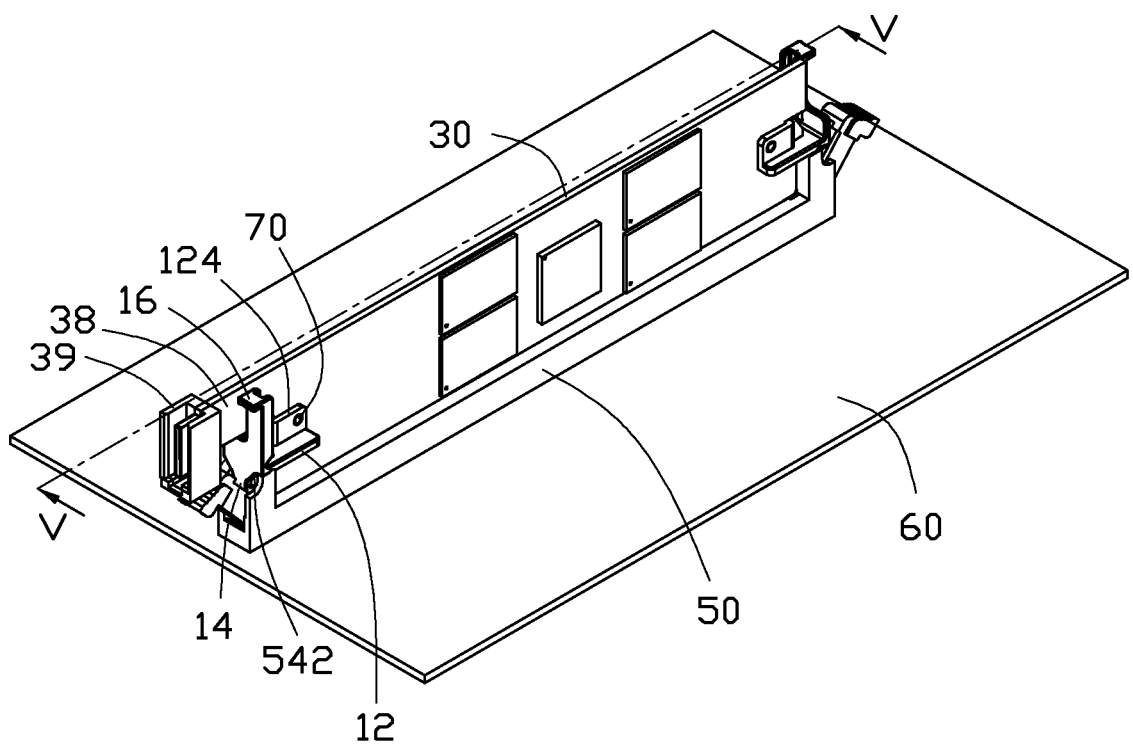
FIG. 4 is an assembled, isometric view of FIG. 1.
Figure 5:
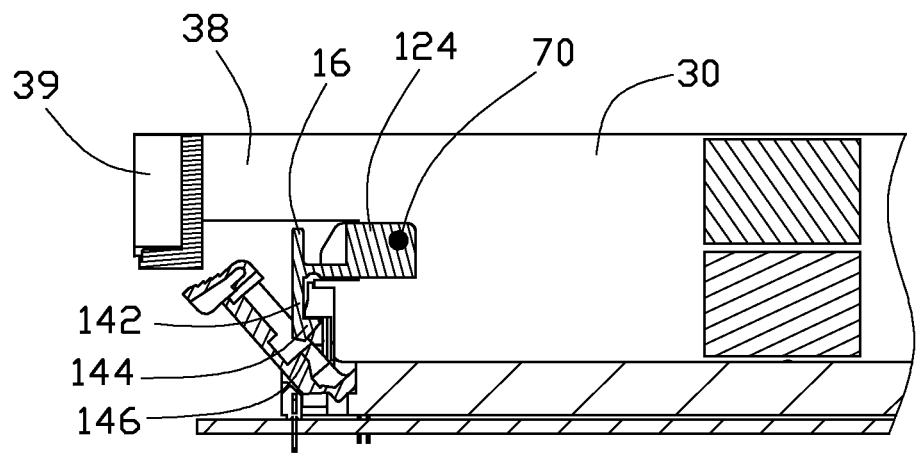
FIG. 5 is a sectional view of FIG. 4, taken along the line of V-V.

Referring to FIGS. 4 and 5, in assembling the expansion card 30 to the expansion slot 50, the edge connector 32 is inserted into the expansion slot 50. Each latching member 10 is pressed down, the guiding surfaces 146 engage with the corresponding latching blocks 542 of the fixing portions 54, deforming the extension plates 142 away from each other, until the latches 144 pass by the latching blocks 542. The extension plates 142 are restored to allow the latches 144 to latch the bottoms of the latching blocks 542. The expansion card 30 is securely latched to the expansion slot 50.

In disassembling the expansion card 30 from the expansion slot 50, the operation portions 16 of the latching members 10 are pressed toward each other, with deforming the extension plates 142 away from each other, until the latches 144 are disengaged from the corresponding latching blocks 542. The expansion card 30 is ready to be removed from the expansion slot 50.

Figure 6:
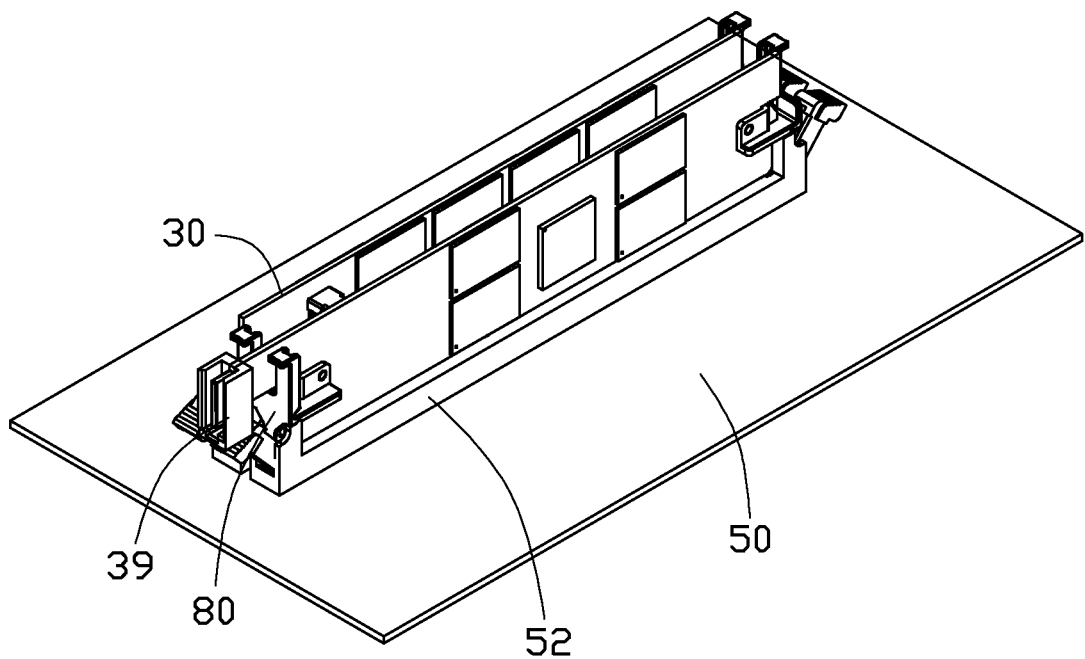
FIG. 6 is an assembled, isometric view of a second exemplary embodiment of a mounting apparatus, together with two expansion cards, wherein the mounting apparatus includes two latching members.
Figure 7:
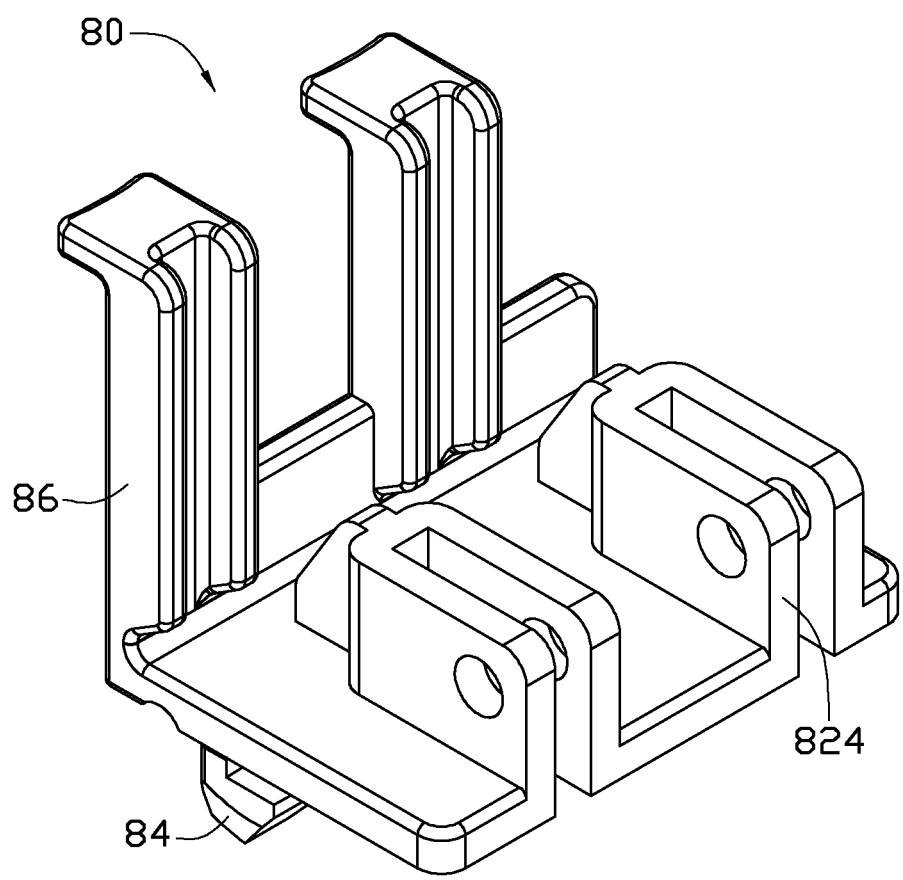
FIG. 7 is an enlarged, isometric view of one of the latching members of FIG. 6, but viewed from another perspective.

Referring to FIGS. 6 and 7, a second embodiment of a mounting apparatus is used for mounting two opposite expansion cards 30. The second embodiment of the mounting apparatus is substantially similar to the first embodiment of the mounting apparatus, except that two latching members 80 replace the latching members 10 of the first embodiment. Each latching member 80 is integrally formed with two parallel latching members 10. Each latching member 80 includes two U-shaped latching portions 824 for sandwiching the corresponding expansion cards 30, two hooks 84 for latching the corresponding latching blocks 542, and two parallel operation portions 86.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A latching member for latching an expansion card to an expansion slot, the latching member comprising: a base plate for being mounted to an end of the expansion card; and a resilient hook extending down from the base plate to latch to an end of the expansion slot; wherein a connecting slot is defined in a second end of the base plate opposite to the hook, with an end of the connecting slot extending through the second end of the base plate, for receiving the end of the expansion card; wherein a latching portion extends up from the base plate around the connecting slot, for sandwiching the end of the expansion card; wherein the latching portion is substantially U-shaped, and comprises two opposite engaging plates perpendicularly extending up from the base plate and at opposite sides of the connecting slot, and a connecting portion connected between rear ends of the engaging plates opposite to the second end surface of the base plate.

2. The latching member of claim 1, wherein the base plate is substantially rectangular, the hook comprises a resilient extension plate extending down from a first end of the base plate, and a latch extending from a distal end of the extension plate to latch to the end of the expansion card.

3. The latching member of claim 2, further comprising an operation portion extending up from the first end of the base plate away from the hook.

4. The latching member of claim 1, wherein two through holes are oppositely defined in the engaging plates, a fixing pole is to extend through one of the through holes, the end of the expansion card, and the other through hole.

5. The latching member of claim 1, wherein the latching member is made of plastic.

6. A mounting apparatus for an expansion card, comprising: an expansion slot into which an edge connector of the expansion card is inserted, two latching blocks extending out from two opposite ends of the expansion slot; and two latching members mounted to two opposite ends of the expansion card, to latch with the latching blocks, respectively; wherein each latching member comprises: a base plate for being mounted to a middle portion of an end of the expansion card; and a resilient hook extending down from the base plate to latch a corresponding one of the latching blocks; wherein a connecting slot is defined in a second end of the base plate opposite to the hook, with an end of the connecting slot extending through the second end of the base plate, for receiving an end of the expansion card; wherein a latching portion extends up from the base plate around the connecting slot, for engaging with the end of the expansion card; wherein the latching portion is substantially U-shaped, and comprises two opposite engaging plates perpendicularly extending up from the base plate and at opposite sides of the connecting slot, and a connecting portion connected between rear ends of the engaging plates opposite to the second end surface of the base plate, for sandwiching the end of the expansion card.

7. The mounting apparatus of claim 6, wherein the base plate is substantially rectangular, the hook comprises a resilient extension plate extending down from a first end of the base plate, and a latch extending from a distal end of the extension plate, the latch is latched to a bottom of the corresponding latching block.

8. The mounting apparatus of claim 7, wherein the latching member further comprises an operation portion extending up from the first end of the base plate away from the hook.

9. The mounting apparatus of claim 6, wherein two through holes are oppositely defined in the engaging plates, a fixing pole is to extend through one of the through holes, the end of the expansion card, and the other through hole.

10. The mounting apparatus of claim 6, wherein the latching member is made of plastic.

11. An assembly comprising: a motherboard; an expansion card comprising an edge connector formed on a bottom side of the expansion card; an expansion slot mounted on the motherboard into which the edge connector is inserted, two latching blocks extending out from two opposite ends of the expansion slot; and two latching members respectively mounted to two opposite ends of the expansion cards, to latch with the latching blocks, respectively; wherein each latching member comprises: a base plate for being mounted to the end of the expansion card; and a resilient hook extending down from a first end of the base plate to latch a corresponding one of the latching blocks; wherein a connecting slot is defined in a second end of the base plate for receiving the end of the expansion card, a latching portion extends up from the base plate around the connecting slot, for sandwiching an end of the expansion card, a fixing pole extends through the latching portion and the end of the expansion card; wherein the latching portion is substantially U-shaped, and comprises two opposite engaging plates perpendicularly extending up from the base plate and at opposite sides of the connecting slot, and a connecting portion connected between rear ends of the engaging plates opposite to the second end surface of the base plate.

* * * * *